United States Patent [19]

Komohara

[11] Patent Number: 4,783,122
[45] Date of Patent: Nov. 8, 1988

[54] SYSTEM FOR ATTACHING THE SAFETY BELT TO THE SEAT
[75] Inventor: Minoru Komohara, Gifu, Japan
[73] Assignee: Ikeda Bussan Co., Ltd., Ayase, Japan
[21] Appl. No.: 912,517
[22] Filed: Sep. 29, 1986
[30] Foreign Application Priority Data Sep. 30, 1985 [JP] Japan .................. 60-149789

[51] Int. Cl.$^4$ .............................................. B60R 22/26
[52] U.S. Cl. .................................. 297/468; 280/801; 297/482
[58] Field of Search ............... 297/468, 473, 482, 485; 280/801

[56] References Cited

U.S. PATENT DOCUMENTS 2,953,189  9/1960  Barash ............................. 297/470 X
3,178,225  4/1965  Bayer ................................. 297/470
3,832,002  8/1974  Eggert, Jr. et al. ............. 297/470 X
4,527,835  7/1985  Barnett ................................ 297/482

FOREIGN PATENT DOCUMENTS 2911433 10/1979  Fed. Rep. of Germany ...... 297/468
   8941  1/1980  Japan ................................ 297/468
  14526  1/1984  Japan ................................ 297/468

Primary Examiner—Kenneth J. Dorner
Assistant Examiner—Peter R. Brown
Attorney, Agent, or Firm—Foley & Lardner, Schwartz, Jeffery, Schwaab, Mack, Blumenthal & Evans

[57] ABSTRACT

A system for attaching the safety belt to a seat in the car is characterized by a recess provided at the side of a seat frame. A free end of the safety belt is fastened to the recess and the other end of the safety belt extends outward through a trim cover which covers a seat portion of the seat.

4 Claims, 2 Drawing Sheets

SYSTEM FOR ATTACHING THE SAFETY BELT TO THE SEAT

BACKGROUND OF THE INVENTION a. Field of the Invention

The present invention relates to a system for attaching a safety belt to a seat in a car.

b. Description of the Prior Art

The conventional system for attaching the safety belt to the seat in the car is shown in FIG. 1. The seat 3 comprises a seat portion 1 and, a back portion 2 and a flange 4 projected sideward from under the seat portion 1. An end of a safety belt 5 is fixed to the projected portion of the flange 4 by means of a bolt or the like. In this conventional system, however, the system for attaching the safety belt 5 to the seat 3 is exposed on the side of the seat portion 1 and this exposed portion of the system is likely to strike against or hook persons and/or objects in the car. In addition, it detracts from the appearance of the seat. It has been therefore proposed that the flange 4 be covered by a cover.

Even if the flange 4 is covered by a cover, its cover-coated portion is still projected sideward from the seat portion 1, so that the problem still remains that its cover-coated portion strikes against or hooks persons and objects in the car. In addition, a different material of cover is needed.

SUMMARY OF THE INVENTION

The present invention is therefore intended to eliminate the above-mentioned drawbacks and an object of the present invention is to provide a system for attaching the safety belt to the seat, which would never strike against or hook persons and objects in the car.

Another object of the present invention is to provide a safety belt attaching system capable of keeping the seat and its surroundings beautiful and guaranteeing the safety of persons in the car.

These objects of the present invention can be achieved by a safety belt attaching system comprising a frame having a recess at the side of a seat portion, and a safety belt whose one free end is fixed to the recess and whose other fastening end extends outside through a trim cover of the seat portion.

The safety belt attaching system of the present invention is housed in a space defined by the recess of the frame and the trim cover.

According to the present invention, therefore, the safety belt attaching system is not exposed on the side of the underside of the seat portion of a seat and is covered by the trim cover, thereby preventing it from striking against or hooking persons and objects in the car and making it unnecessary to use a different cover material or the like.

DETAILED DESCRIPTION OF THE PREFERRED EMBODIMENT

Figure 1:
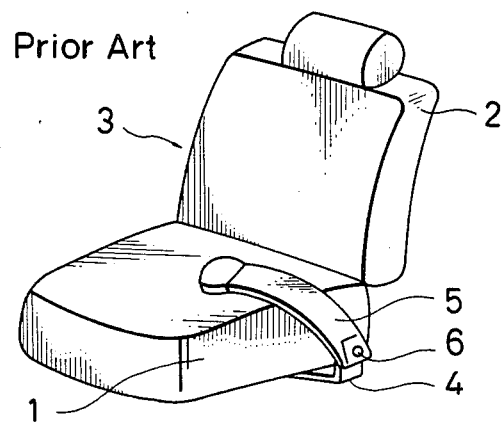
FIG. 1 is a perspective view showing a conventional seat in the car.
Figure 2:
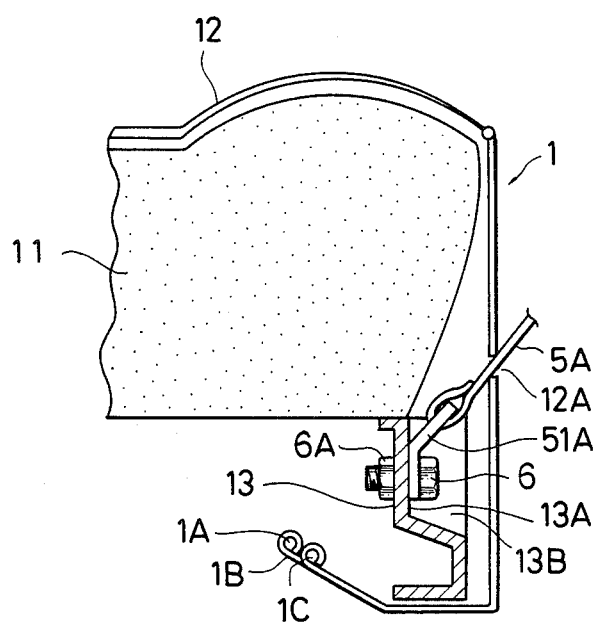
FIG. 2 is a sectional view showing a safety belt attached in the case of an example of the safety belt attaching system according to the present invention.
Figure 3:
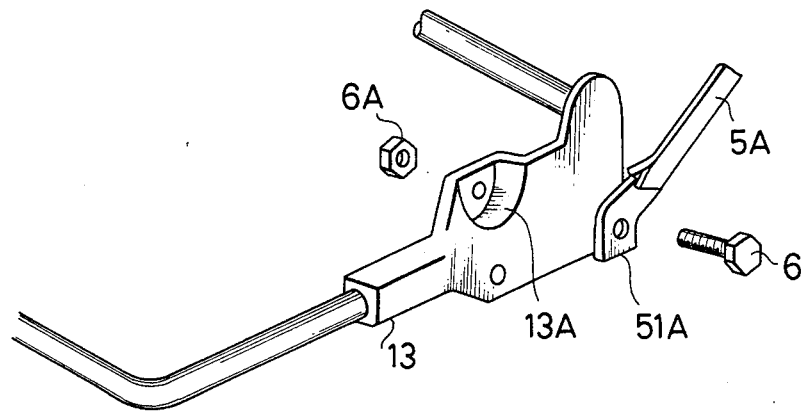
FIG. 3 is a perspective view showing the safety belt attaching system dismantled.
Figure 4:
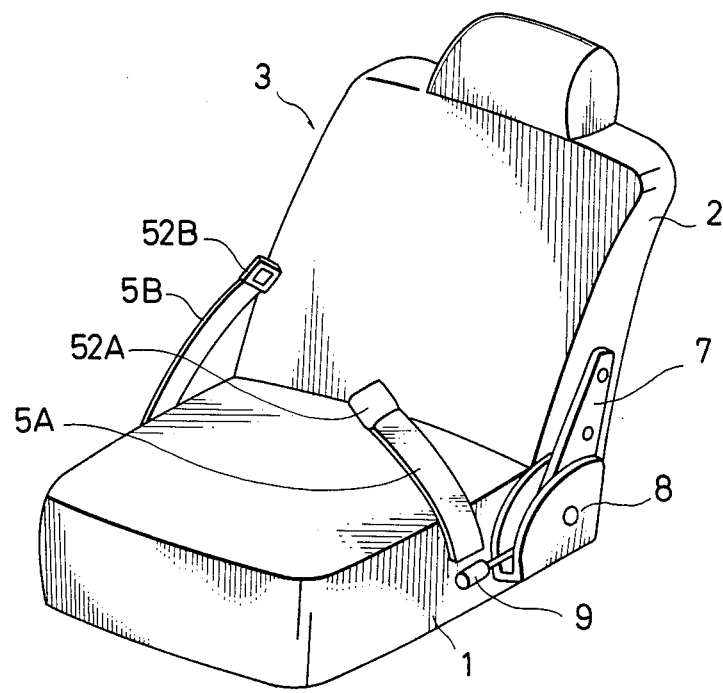
FIG. 4 is a perspective view showing a seat wherein the safety belt attaching system is employed.

An embodiment of the present invention will be described referring to FIGS. 2 through 4. In FIG. 4, a seat 3 comprises a seat portion 1 and a back portion 2. A side arm 7 attached to the side of the back portion 2 is freely swingably attached to a base bracket 8 fixed to the side of the seat portion 1 and the back portion 2 can be adjusted to any predetermined reclining positions by means of the side arm 7. As shown in FIG. 2, the seat portion 1 comprises a cushion material 11, a trim cover 12 for covering the cushion material 11, and a seat frame 13, at one side of which a recess 13A is provided. A metal fitting 51A is fixed to the recess 13A by means of a bolt 6 and a nut 6A and a free end of a safety belt 5A is attached to the metal fitting 51A. That portion of the metal fitting 51A which extends upward from the bolt and nut 6 and 6A, namely, that portion to which the free end of the safety belt 5A is attached, is bent away from the side of the seat frame, that is, in an outwardly slanting direction. The trim cover 12 is provided with a slit 12A which corresponds, in position, to the recess 13A. The other end of the safety belt 5 to which a fastening metal fitting 52A extend outside through the slit 12A in the trim cover 12. Similarly, another safety belt 5B which is paired with the safety belt 5A extends from the other side of the seat portion 1, with a fastening metal fitting 52B attached to the upper end thereof. A wire 1C is fixed to the trim cover 12 along the end edge thereof and it is fastened to another wire 1A by means of clips 1B under the seat portion 1. The free end of the trim cover 12 is also similarly fixed.

The safety belt attaching system comprising the safety belt 5A, metal fitting 51A, bolt 6, nut 6A and the like is housed in a space 13B which is defined by the recess 13A and trim cover 12. Therefore, its flange would never strike against or hook any person and object in the car. In addition, it would never be exposed so as to disturb the appearance of the seat.

Although the present invention has been described with reference to its preferred embodiment, it should be understood that the present invention is not limited by this embodiment but various changes and modifications can be made without departing from the spirit and scope of the present invention.

I claim:

1. A system for attaching a safety belt to a seat having a seat frame and a cushion material which are covered by a trim cover, comprising:
    means defining a recess in the seat frame for receiving one end of the safety belt;
    means for attaching the one end of the safety belt directly to said means defining a recess wherein the one end of the safety belt is received within said recess and is directly attached to said means defining a recess; and
    an opening in the trim cover through which the safety belt outwardly extends; wherein,
    said means defining a recess comprises inwardly bent portions of a side of the seat frame, whereby the trim cover covers the end of the safety belt received within said recess.

2. A system as claimed in claim 1, wherein said opening in the trim cover is a slit.

3. A system as claimed in claim 1, further comprising a metal fitting located in said recess to which the one end of the safety belt is fastened.

4. A system as claimed in claim 1, wherein said metal fitting is fixed to a side of the seat frame and the portion of said metal fitting to which the one end of the safety belt is fastened is bent outward from the side of the seat frame.

* * * * *